United States Patent
Cao

(10) Patent No.: US 11,681,697 B2
(45) Date of Patent: Jun. 20, 2023

(54) METHOD AND DEVICE FOR INTERFACE OPERATION AND MAINTENANCE

(71) Applicant: BOE Technology Group Co., Ltd., Beijing (CN)

(72) Inventor: Fang Cao, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 196 days.

(21) Appl. No.: 16/765,893

(22) PCT Filed: Oct. 23, 2019

(86) PCT No.: PCT/CN2019/112751
§ 371 (c)(1),
(2) Date: May 21, 2020

(87) PCT Pub. No.: WO2020/088326
PCT Pub. Date: May 7, 2020

(65) Prior Publication Data
US 2020/0320066 A1  Oct. 8, 2020

(30) Foreign Application Priority Data
Oct. 31, 2018 (CN) .......................... 201811287912.6

(51) Int. Cl.
*G06F 16/245* (2019.01)
*G06F 16/248* (2019.01)
*G06F 9/54* (2006.01)

(52) U.S. Cl.
CPC ............ *G06F 16/245* (2019.01); *G06F 9/541* (2013.01); *G06F 16/248* (2019.01)

(58) Field of Classification Search
CPC ...... G06F 16/245; G06F 16/248; G06F 9/541; G06F 16/252; G06F 16/2428
See application file for complete search history.

(56) References Cited

U.S. PATENT DOCUMENTS 10,235,417 B1 * 3/2019 Sterin ................. G06F 16/1805
2005/0216453 A1   9/2005 Sasaki et al.
(Continued)

FOREIGN PATENT DOCUMENTS

CN    1674004 A    9/2005
CN  103177116 A    6/2013
(Continued)

OTHER PUBLICATIONS

Chinese Office Action dated Aug. 19, 2019 in related Chinese Application No. 201811287912.6.
(Continued)

*Primary Examiner* — Alicia M Willoughby
(74) *Attorney, Agent, or Firm* — ArentFox Schiff LLP; Michael Fainberg

(57) ABSTRACT

The embodiments of present disclosure provide a method and device for interface operation and maintenance. The method includes: acquiring query condition parameters input by a user for querying interface log information of at least one system, wherein the query condition parameters at least include a message time parameter that uniquely marks log message time and a system name parameter that uniquely marks the system; invoking an application programming interface provided by the at least one system according to the system name parameter in the query condition parameters, and acquiring first interface log information according to a result of invoking the application programming interface; determining second interface log information in the first interface log information according to the message time parameter that uniquely marks the log message time; and displaying the second interface log information.

8 Claims, 5 Drawing Sheets

(56) References Cited

U.S. PATENT DOCUMENTS

| | | | | |
|---|---|---|---|---|
| 2008/0104008 A1* | 5/2008 | Brantley | ................... | G06F 9/54 |
| 2012/0054675 A1* | 3/2012 | Rajamannar | ........ | G06F 11/3476 |
| | | | | 715/809 |
| 2012/0124035 A1* | 5/2012 | Vaidyanathan | ....... | G06F 16/903 |
| | | | | 707/723 |
| 2013/0282748 A1* | 10/2013 | Liensberger | ........ | G06F 9/44526 |
| | | | | 707/766 |
| 2015/0169288 A1* | 6/2015 | Yamamoto | ................ | G06F 7/24 |
| | | | | 707/752 |
| 2016/0085772 A1* | 3/2016 | Vermeulen | .............. | G06F 16/21 |
| | | | | 707/615 |
| 2017/0193063 A1* | 7/2017 | Gupta | ................ | H04M 1/72403 |
| 2017/0228460 A1* | 8/2017 | Amel | ................... | G06F 16/2462 |
| 2018/0189328 A1* | 7/2018 | Frazier | .................. | G06F 16/254 |
| 2020/0320066 A1 | 10/2020 | Cao | | |
| 2021/0149905 A1* | 5/2021 | Luo | .................... | G06F 16/2272 |
| 2021/0406317 A1* | 12/2021 | Beedgen | ............. | G06F 16/9035 |

FOREIGN PATENT DOCUMENTS

| | | | |
|---|---|---|---|
| CN | 106992886 | A | 7/2017 |
| CN | 107291872 | A | 10/2017 |
| CN | 107463602 | A | 12/2017 |
| CN | 107784050 | A | 3/2018 |
| CN | 108255688 | A | 7/2018 |
| CN | 108255905 | A | 7/2018 |
| CN | 109408337 | A | 3/2019 |

OTHER PUBLICATIONS

Chinese Office Action dated Aug. 3, 2020 in related Chinese Application No. 201811287912.6.

* cited by examiner

Fig. 2

| Message ID | | Operation status | ERROR ▼ | | Service response result code | |
|---|---|---|---|---|---|---|
| Invoker | ▼ | Service type | | | Service response result information | |
| Server | ▼ | Interface name | | | Message time | 2018-05-31 00:00:00 📅 2018-05-31 23:59:59 📅 |
| Service name | | Service keyword | | | System name | ▼ Client code | search  reset

Fig. 3

METHOD AND DEVICE FOR INTERFACE OPERATION AND MAINTENANCE

CROSS REFERENCE TO RELATED APPLICATIONS

The present disclosure is a National Stage of International Application No. PCT/CN2019/112751, filed on Oct. 23, 2019, which claims priority to Chinese Patent Application No. 201811287912.6, filed to the Chinese Patent Office on Oct. 31, 2018 and entitled "Method and Device for Interface Operation and Maintenance", the entire contents of which are incorporated herein by reference.

FIELD

The present disclosure relates to the field of IT operation and maintenance, and in particular to a method and device for interface operation and maintenance.

BACKGROUND

In the related art, with more and more enterprise information systems, there are more and more cross-system integration interfaces, and an enterprise may have a plurality of systems. During a daily operation and maintenance monitoring process, operation and maintenance personnel need to log in to a plurality of systems to query interface logs before determining a specific problem of an interface. For the same interface, the personnel need to repeat a query by inputting the same query condition into the different systems. Thus, the operation and maintenance process is highly repetitive and takes a rather long time, which is not beneficial to quickly solving the interface problem.

SUMMARY

According to a first aspect, the embodiment of the present disclosure provides a device for interface operation and maintenance, including:

an acquiring module configured to acquire query condition parameters input by a user for querying interface log information of at least one system, wherein the query condition parameters at least include a message time parameter that uniquely marks log message time and a system name parameter that uniquely marks the system;

an invoking module configured to invoke an application programming interface provided by the at least one system according to the system name parameter in the query condition parameters, and acquire a first interface log information according to a result of invoking the application programming interface;

a determining module configured to determine a second interface log information according to the message time parameter that uniquely marks the log message time in the first interface log information; and a display module configured to display the second interface log information.

Optionally, the query condition parameters further include one or a combination of: an interface name, an invoker, a server, a service name, a service type, a service keyword, a service response result code, service response result information, and a client code.

Optionally, the device further includes:

a display information determining module configured to acquire at least one query condition parameter input by the user except the message time parameter and the system name parameter, and select and determine the second interface log information for display according to the at least one query condition parameter.

Optionally, the device further includes:

a formatted log information acquiring module configured to determine a first type of data included in the second interface log information, determine a first data format corresponding to the first type according to a preset correspondence between a data type and a data format, and acquire formatted second interface log information by formatting the data included in the second interface log information according to the first data format.

Optionally, the device further includes:

a storing module configured to send storage format information to the at least one system.

the invoking module is further configured to receive interface log information sent by the at least one system and converted in a unified interface message header format according to the storage format information.

Optionally, data parameters in the unified interface message header format include: an identification log message parameter, an identification interface parameter, an identification invoker system parameter, an identification receiver system parameter, and an identification service parameter, wherein the identification log message parameter indicates a serial number of each log message;

the identification interface parameter indicates a name of each interface;

the identification invoker system parameter indicates a name of a system invoking an interface;

the identification receiver system parameter indicates a name of a system receiving log information; and the identification service parameter indicates a name of a service transmitted by an interface.

According to a second aspect, the embodiment of the present disclosure provides a method for interface operation and maintenance, including:

acquiring query condition parameters input by a user for querying interface log information of at least one system, wherein the query condition parameters at least include a message time parameter that uniquely marks log message time and a system name parameter that uniquely marks the system;

invoking an application programming interface provided by the at least one system according to the system name parameter in the query condition parameters, and acquiring a first interface log information according to a result of invoking the application programming interface;

determining a second interface log information according to the message time parameter that uniquely marks the log message time in the first interface log information; and displaying the second interface log information.

Optionally, the query condition parameters further include one or a combination of: an interface name, an invoker, a server, a service name, a service type, a service keyword, a service response result code, service response result information, and a client code;

before the displaying the second interface log information, the method further includes:

acquiring at least one query condition parameter input by the user except the message time parameter and the system name parameter; and selecting and determining second interface log information for display in the second interface log information according to the at least one query condition parameter.

Optionally, before the displaying the second interface log information, the method further includes:

determining a first type of data included in the second interface log information;

determining a first data format corresponding to the first type according to a preset correspondence between a data type and a data format; and acquiring formatted second interface log information by formatting the data included in the second interface log information according to the first data format.

Optionally, before the displaying the second interface log information, the method further includes:

sending storage format information to the at least one system; and receiving interface log information sent by the at least one system and converted in a unified interface message header format according to the storage format information.

Optionally, data parameters in the unified interface message header format include: an identification log message parameter, an identification interface parameter, an identification invoker system parameter, an identification receiver system parameter, and an identification service parameter, wherein the identification log message parameter indicates a serial number of each log message;

the identification interface parameter indicates a name of each interface;

the identification invoker system parameter indicates a name of a system invoking an interface;

the identification receiver system parameter indicates a name of the system receiving log information; and the identification service parameter indicates a name of a service transmitted by an interface.

According to a third aspect, the embodiment of the present disclosure provides a computer-readable storage medium.

The computer-readable storage medium includes a computer program, and the computer program is used for being executed on a computer to perform the method according to the first aspect of the aforesaid methods.

According to a fourth aspect, the embodiment of the present disclosure provides a computer program product including instructions which are used for being executed on a computer to perform the method according to the first aspect of the aforesaid methods.

BRIEF DESCRIPTION OF THE DRAWINGS

FIG. 2 is a schematic diagram of an interface log information displaying interface according to an embodiment of the present disclosure;

FIG. 3 is a schematic diagram of a query interface according to an embodiment of the present disclosure;

DETAILED DESCRIPTION OF THE EMBODIMENTS

With more and more enterprise information systems in the related art, there are more and more cross-system integration interfaces, and an enterprise may have a plurality of systems. During a daily operation and maintenance monitoring process, operation and maintenance personnel need to log in to a plurality of systems to query interface logs before determining a specific problem of an interface. For the same interface, the personnel need to repeat a query by inputting the same query condition into the different systems. Thus, the operation and maintenance process is highly repetitive and takes a rather long time, which is not beneficial to quickly solving the problem. For monitoring a cross-system interface realized based on an enterprise service bus, log query shall be performed on at least three or more platforms to ensure correctness of the whole interface regarding data transmission to data processing. Therefore, every time a problem occurs to an interface, the operation and maintenance personnel shall query the logs in the different systems to locate the problem, which causes such a problem that interface operation and maintenance efficiency is rather low. The embodiments of the present disclosure provide following solutions.

In order to solve the aforesaid problem, a general concept of the embodiments of the present disclosure is as follows.

Figure 1:
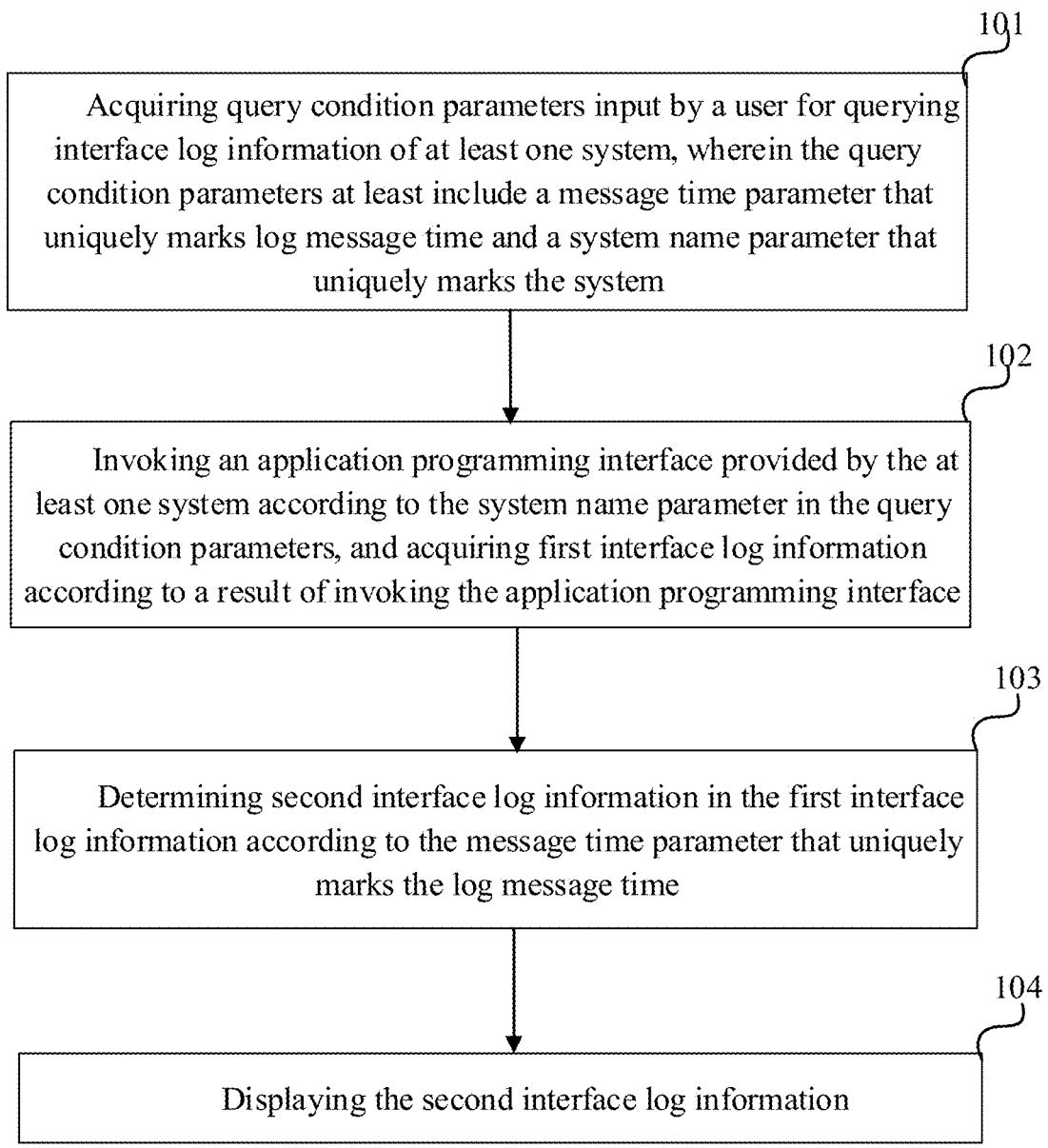
FIG. 1 is a schematic flowchart of a method for interface operation and maintenance according to an embodiment of the present disclosure.

As shown in FIG. 1, the embodiment of the present disclosure provides a method for interface operation and maintenance, which specifically includes following implementation steps.

In step 101, query condition parameters input by a user for querying interface log information of at least one system are acquired. The query condition parameters at least include a message time parameter that uniquely marks log message time and a system name parameter that uniquely marks the system.

When the user inputs the query condition parameters on a page, the user at least inputs the message time parameter and the system name parameter. Then, the system name parameter may be adopted to query the interface log information of the different systems on a unified platform to determine the system to be queried.

After acquiring a query condition input by the user, the method for determining the interface log information based on the query condition parameters input by the user specifically includes following steps.

In step 102, an application programming interface provided by the at least one system is invoked according to the system name parameter in the query condition parameters, and first interface log information is acquired according to a result of invoking the application programming interface.

The application programming interface corresponding to the system name parameter may be determined according to the system name parameter input by the user, and then the application programming interface is invoked to acquire the first interface log information which is namely the interface log information corresponding to the system. The first interface log information includes log information of all interfaces of the system.

After the first interface log information is determined, the interface log information as required shall be further screened out more accurately, which specifically includes following steps.

In step 103, second interface log information in the first interface log information is determined according to the message time parameter that uniquely marks the log message time.

Each piece of information in the first interface log information has a message time parameter which uniquely marks the log message time, and the second interface log information is finally screened and determined from the first interface log information based on the message time parameter input by the user.

After the second interface log information is determined by the aforesaid method, the second interface log information shall be displayed on a foreground page, which specifically includes following steps.

In step 104, the second interface log information is displayed.

Figure 2:
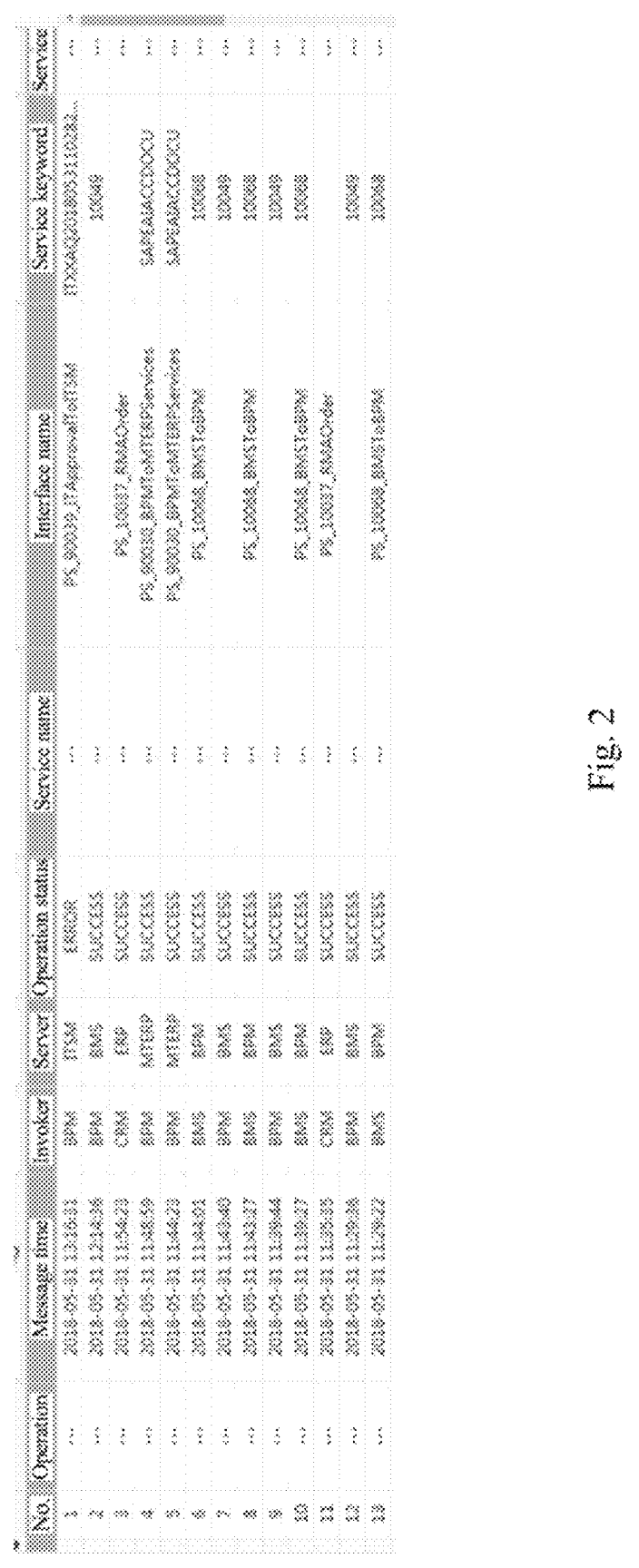

As shown in FIG. 2, while being displayed on the foreground page, the second interface log information may be displayed in a list form, which mainly displays a part or all of the interface log information, such as message time, an interface invoker, an interface server, an interface operation status, a service name, an interface name and a service keyword.

In order to make it more convenient for the interface operation and maintenance personnel to locate and thereby quickly solve the interface problem, the present disclosure may further provide the following solution so that the interface operation and maintenance personnel can screen out the interface log information as desired through multi-dimensional parameters (a plurality of query condition parameters).

Regarding acquiring the query condition parameters input by the user for querying the interface log information of the at least one system, it may be performed by querying an interface so that the operation and maintenance personnel can conveniently input the query condition parameters, and the system can conveniently acquire the query condition parameters.

As shown in FIG. 3, in the query interface, the query condition parameters further include one or a combination of: an interface name, an invoker, a server, a service name, a service type, a service keyword, a service response result code, service response result information, and a client code. The interface log information for display may be finally determined by acquiring the query condition parameters input by the user at the query interface.

The multi-dimensional parameters refer to following dimensions:

a time dimension: an operation status of the interface may be queried according to the time dimension and specifically determined by the message time parameter;

a status dimension: an operation status of the interface may be queried according to the operation status and specifically determined by an operation status parameter;

a service dimension: the operation status of the interface may be queried according to the service type, the service keyword, the service response interface code and the service response result information, and specifically determined by parameters of the service type, the service keyword, the service response interface code and the service response result information; and a technology dimension: the operation status of the interface may be queried according to the invoker, the server, the message ID, the interface name, and the service name, and specifically determined by parameters of the invoker, the server, the message ID, the interface name, and the service name.

Thus, before displaying the second interface log information, the embodiment of the present disclosure may further include: acquiring at least one query condition parameter input by the user except the message time parameter and the system name parameter, and selecting and determining second interface log information for display in the second interface log information according to the at least one query condition parameter. When other aforesaid query condition parameters input by the user except the message time parameter and the system name parameter are acquired, the second interface log information for display is screened and determined from the first interface log information based on the query condition parameters.

After the second interface log information for display is acquired, a platform processing layer shall convert a data format to meet a demand on foreground display. Thus, the second interface log information shall be processed to a corresponding format to be thereby displayed on the page. Thus, before displaying the second interface log information, the method may further include following steps: determining a first type of data included in the second interface log information; then, determining a first data format corresponding to the first type according to a preset correspondence between a data type and the data format; and acquiring formatted second interface log information by formatting the data included in the second interface log information according to the first data format.

The aforesaid format refers to the format displayed at the foreground. For example, a date format displayed at the foreground is 2018-10-10, and data read in the background are 20181010. Under this situation, in order to meet the demand on the foreground display, the platform processing layer needs to convert the data format of a date, and a format of each data read in the background has a preset correspondence with the format displayed in the foreground so that the formatted second interface log information may be determined finally according to the preset correspondence.

The advantage of the solution of the present disclosure is that the interface log information of the same interface in the different systems can be acquired by inputting different system name parameters on the unified platform, which avoids complicated procedures of querying by logging in to the different systems. In order to display the log information of the different systems on the same platform, the respective data shall be stored and transmitted according to a unified format before displaying the interface log information.

In particular, before displaying the second interface log information, the method may include following steps:

sending storage format information to the at least one system; and receiving interface log information sent by the at least one system and transmitted after being converted in a unified interface message header format according to the storage format information. Data parameters in the unified interface message header format include: an identification log message parameter, an identification interface parameter, an identification invoker system parameter, an identification receiver system parameter, and an identification service parameter.

The unified interface message header format may be realized by following codes. An interface ID label represents the identification interface parameter; a transID label represents an identification service parameter; a messageID label represents an identification message parameter; a sender label represents an invoker system parameter; a receiver label represents a receiver system parameter; and appID and appToken labels represent reserved addable parameters:

```
<header>
  <interfaceID>?</interfaceID>
  <transID>?</transID>
  <messageID>?</messageID>
  <sender>?</sender>
```

-continued

```
<receiver>?</receiver>
<!—Optional:-->
<appID>?</appID>
<!—Optional:-->
<appToken>?</appToken>
</header>.
```

The identification log message parameter indicates a serial number of each log message.

The identification interface parameter indicates a name of each interface.

The identification invoker system parameter indicates a name of the system invoking the interface.

The identification receiver system parameter indicates a name of the system receiving log information.

The identification service parameter indicates a name of a service transmitted by the interface.

Figure 4:
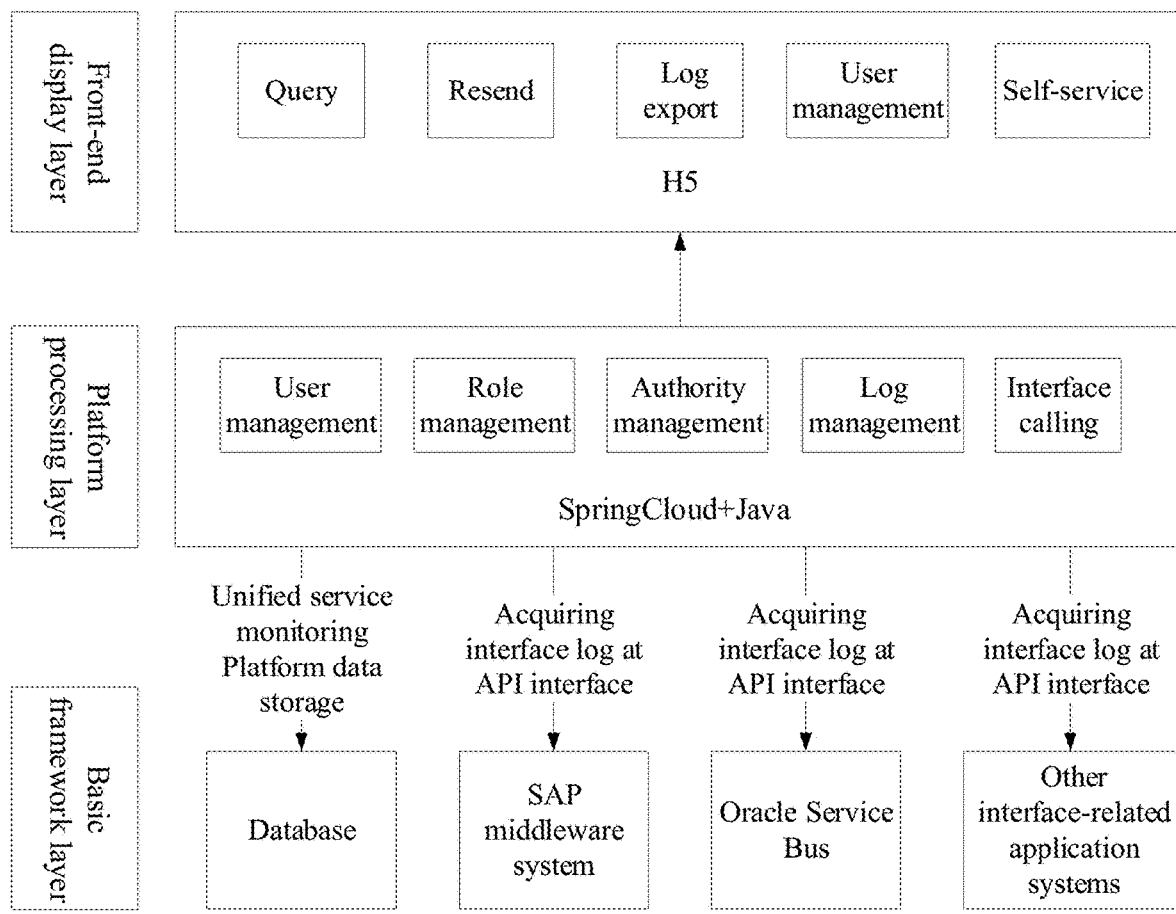
FIG. 4 is a schematic diagram of a framework of a platform for interface operation and maintenance according to an embodiment of the present disclosure.

The solution of the present disclosure is implemented based on an interface operation and maintenance platform. As shown in FIG. 4, the platform established in the solution of the present disclosure is composed of a front-end display layer, the platform processing layer, and a basic framework layer.

The front-end display layer may realize log processing functions such as log query, error message retransmission, and log export via an H5 technology. A user management is configured to manage and maintain an account of the platform, and the self-service is configured to self-register the system related to the interface to be monitored.

The platform processing layer is configured to implement a user role-related management and other platform-related managements, manage system operation logs, and invoke API interfaces in the system where each interface log is located, so that details of a corresponding interface processing status are acquired and thereby displayed at the front-end display layer.

As to the basic framework layer, a database is the platform's own database for storing user system logs and other related system information. An SAP (System Applications and Products, a German company) middleware system provides log details related to SAP system integration; an OSB (Oracle Service Bus) provides interface logs integrated through the OSB; and other interface-related application systems provide their own logs for processing interface messages.

The method for interface operation and maintenance according to the embodiments of the present disclosure will be specifically introduced below through specific application scenarios.

The first application scenario is to locate an interface problem in an interface service for business travel reimbursement.

In an enterprise, a service procedure for the business reimbursement is as follows: after approval of a travel report in a portal system is completed, an accounting document may be generated in an SAP ERP system; and then, an invoking relationship in the system is that the portal system invokes an ESB interface, and an ESB invokes an SAP ERP interface to create the accounting document. When a problem occurs to the interface, an operator in the portal system may firstly report the problem, and then the operation and maintenance personnel of the portal log in to the portal system and examine an operation log to check whether the ESB interface is successfully invoked. If it is successful, the operation and maintenance personnel of the ESB log in to an ESB system to check whether the ESB has successfully received a message. If the ESB successfully receives the message and successfully sends to SAP ERP, the ERP interface operation and maintenance personnel log in to the ERP system and examine the interface log to analyze the problem. In this process, at least three interface operation and maintenance personnel are required to log in to the at least three systems to query messages, and query conditions as input to query the same interface log are all repetitive, which is not beneficial to improving interface operation and maintenance efficiency.

Based on such complicated operations, the present disclosure reduces respective login of a plurality of platforms by a unified login entry. If it is required to rapidly and comprehensively query an operation condition of the interface on a unified platform, what is merely needed is to acquire portal, ESB and ERP system name parameters respectively input by the operation and maintenance personnel at system name parameter positions. In particular, the operation and maintenance personnel may input a system name parameter portal in the query interface shown in FIG. 3, or may add other query condition parameters according to needs to determine the operation status of the interface in the system. If a query result shows that the operation status of the interface in the portal system is normal, ESB and ERP system name parameters are respectively input to the query interface to locate the interface operation problem. Thanks to the query method provided by the present disclosure, the operation status of the interface in each system can be rapidly queried so that the problem can be rapidly located and the interfaces with the problem can be timely processed, thereby improving the operation and maintenance efficiency.

Figure 5:
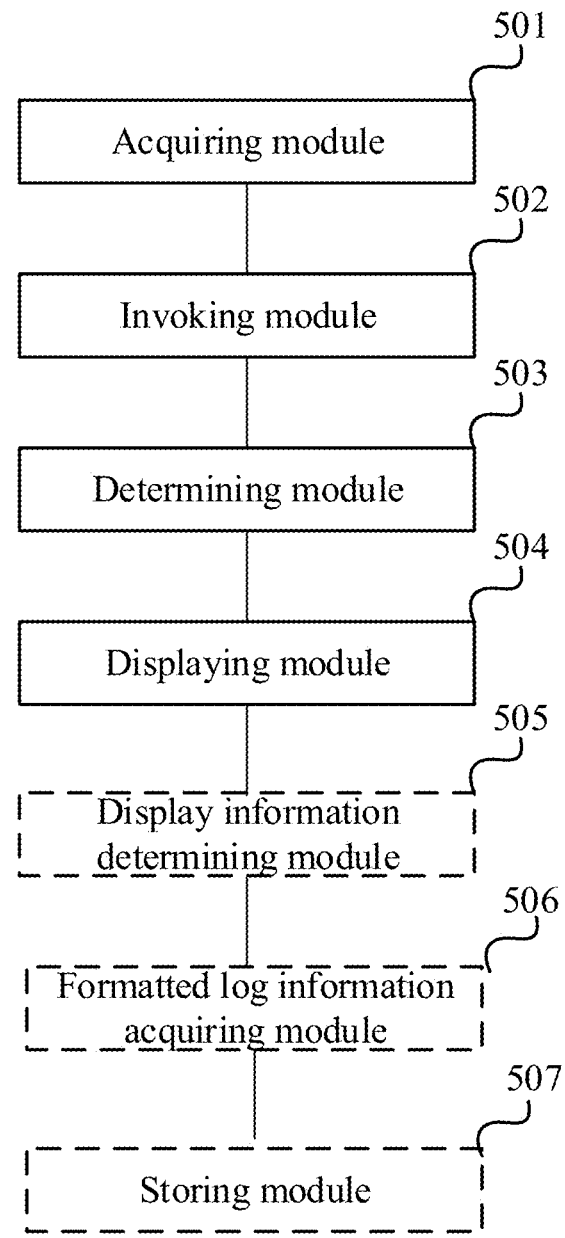
FIG. 5 is a schematic diagram of a device for interface operation and maintenance according to an embodiment of the present disclosure.

Based on the same inventive concept, as shown in FIG. 5, the embodiment of the present disclosure further provides a device for interface operation and maintenance based on the aforesaid method, which includes following modules.

An acquiring module 501 is configured to acquire query condition parameters input by a user for querying interface log information of at least one system, wherein the query condition parameters at least include a message time parameter that uniquely marks log message time and a system name parameter that uniquely marks the system.

A invoking module 502 is configured to invoke an application programming interface provided by the at least one system according to the system name parameter in the query condition parameters, and acquire first interface log information according to a result of invoking the application programming interface.

A determining module 503 is configured to determine second interface log information in the first interface log information according to the message time parameter that uniquely marks the log message time.

A display module 504 is configured to display the second interface log information.

Optionally, the query condition parameters may further include one or a combination of: an interface name, an invoker, a server, a service name, a service type, a service keyword, a service response result code, service response result information, and a client code. The device according to the embodiment of the present disclosure may further include the following module.

A display information determining module 505 is configured to acquire at least one query condition parameter input by the user except the message time parameter and the system name parameter, and select and determine second interface log information for display in the second interface log information according to the at least one query condition parameter. This module is a non-essential module of the solution and indicated by a dotted frame in the figure.

Optionally, the device according to the embodiment of the present disclosure may further include the following module.

A formatted log information acquiring module 506 is configured to determine a first type of data included in the second interface log information, determine a first data format corresponding to the first type according to a preset correspondence between a data type and a data format, and acquire formatted second interface log information by formatting the data included in the second interface log information according to the first data format. This module is a non-essential module of the solution and indicated by a dotted frame in the figure.

Optionally, the device according to the embodiment of the present disclosure may further include the following module.

A storing module 507 is configured to send storage format information to the at least one system, which is a non-essential module of the solution and indicated by a dotted frame in the figure.

The invoking module is further configured to receive interface log information sent by the at least one system and converted in a unified interface message header format according to the storage format information.

Optionally, data parameters in the unified interface message header format include: an identification log message parameter, an identification interface parameter, an identification invoker system parameter, an identification receiver system parameter, and an identification service parameter.

The identification log message parameter indicates a serial number of each log message.

The identification interface parameter indicates a name of each interface.

The identification invoker system parameter indicates a name of the system invoking the interface.

The identification receiver system parameter indicates a name of the system receiving log information.

The identification service parameter indicates a name of a service transmitted by the interface.

The embodiment of the present disclosure provides a computer-readable storage medium.

The computer-readable storage medium includes a computer program, and when the computer program runs on a computer, the computer is caused to perform the method described in FIG. 1.

The embodiment of the present application provides a computer program product including instructions which, when run on a computer, cause the computer to perform the method described in FIG. 1.

One skilled in the art should understand that, the embodiments of the present disclosure may be provided as a method, a system, or a computer program product. Therefore, the present disclosure may be in a form of full hardware embodiments, full software embodiments, or a combination thereof. Moreover, the present disclosure may be in a form of a computer program product that is implemented on one or more computer-usable storage media (including, without limitation, a magnetic disk storage, an optical storage and the like) containing computer-usable program codes.

The present disclosure is described referring to the flow chart and/or block diagram of the method, device (system) and computer program product according to the embodiments of the present disclosure. It should be understood that, each flow and/or block in the flow chart and/or block diagram and a combination of the flows and/or blocks in the flow chart and/or block diagram may be realized via computer program instructions. Such computer program instructions may be provided to a processor of a general-purpose computer, a special-purpose computer, a built-in processor or other programmable data processing devices, to produce a machine so that the instructions executed by the processor of a computer or other programmable data processing devices may produce a device for realizing functions specified in the one or more flows in the flow chart and/or the one or more blocks in the block diagram.

Such computer program instructions may also be stored in a computer-readable storage that can guide the computer or other programmable data processing devices to work in a specific mode so that the instructions stored in the computer-readable storage may produce a manufacture including a commander equipment, wherein the commander equipment may realize the functions specified in the one or more flows of the flow chart and the one or more blocks in the block diagram.

Such computer program instructions may also be loaded to the computer or other programmable data processing devices so that a series of operational processes may be executed on the computer or other programmable devices to produce a computer-realized processing, thereby the instructions executed on the computer or other programmable devices may provide a process for realizing the functions specified in the one or more flows in the flow chart and/or the one or more blocks in the block diagram.

It will be appreciated that one skilled in the art may make various modifications and variations to the present disclosure without departing from the spirit and scope of the present disclosure. Accordingly, if the modifications and variations of the present disclosure fall within the scope of the claims and their equivalents of the present disclosure, the present disclosure is also intended to encompass such modifications and variations.

The invention claimed is:

1. A device for interface operation and maintenance, comprising:
   an acquiring module configured to acquire query condition parameters input by a user for querying interface log information of at least three systems, wherein the query condition parameters at least comprise a message time parameter that uniquely marks log message time instant and a system name parameter that uniquely marks a system;
   an invoking module configured to invoke an application programming interface provided by the at least three systems according to the system name parameter in the query condition parameters, and acquire a first interface log information according to a result of invoking the application programming interface;
   a determining module configured to determine a second interface log information according to the message time parameter that uniquely marks the log message time instant in the first interface log information; and
   a display module configured to display the second interface log information, the second interface log information comprises an operating status of the at least three systems;
   wherein the device further comprising:
   a formatted log information acquiring module configured to determine a first type of data included in the second interface log information, determine a first data format corresponding to the first type according to a preset correspondence between a data type and a data format, and acquire formatted second interface log information by formatting the data included in the second interface log information according to the first data format:
the device further comprising:
a storing module configured to send a storage format information to the at least three systems;
the invoking module further configured to receive an interface log information, the interface log information is converted in a unified interface message header format according to the storage format information and sent by the at least three systems.

2. The device according to claim 1, wherein the query condition parameters further comprise one or a combination of: an interface name, a invoker, a server, a service name, a service type, a service keyword, a service response result code, service response result information, and a client code; and
the device further comprises:
a display information determining module configured to acquire at least one query condition parameter input by the user except the message time parameter and the system name parameter, and select and determine the second interface log information for display according to the at least one query condition parameter.

3. A method for interface operation and maintenance, comprising:
acquiring query condition parameters input by a user for querying interface log information of at least three systems, wherein the query condition parameters at least comprise a message time parameter that uniquely marks log message time instant and a system name parameter that uniquely marks the system;
invoking an application programming interface provided by the at least three systems according to the system name parameter in the query condition parameters, and acquiring a first interface log information according to a result of invoking the application programming interface;
determining a second interface log information according to the message time parameter that uniquely marks the log message time instant in the first interface log information; and
displaying the second interface log information, wherein the second interface log information comprises an operating status of the at least three systems;
wherein before the displaying the second interface log information, the method further comprises:
determining a first type of data included in the second interface log information;
determining a first data format corresponding to the first type according to a preset correspondence between a data type and a data format; and
acquiring formatted second interface log information by formatting the data included in the second interface log information according to the first data format;
wherein before the displaying the second interface log information, the method further comprises:
sending a storage format information to the at least three systems; and
receiving an interface log information, the interface log information is converted in a unified interface message header format according to the storage format information and sent by the at least three systems.

4. The method according to claim 3, wherein the query condition parameters further comprise one or a combination of: an interface name, an invoker, a server, a service name, a service type, a service keyword, a service response result code, service response result information, and a client code; and
before the displaying the second interface log information, the method further comprises:
acquiring at least one query condition parameter input by the user except the message time parameter and the system name parameter; and
selecting and determining the second interface log information for display according to the at least one query condition parameter.

5. The method according to claim 3, wherein data parameters in the unified interface message header format comprise: an identification log message parameter, an identification interface parameter, an identification invoker system parameter, an identification receiver system parameter, and an identification service parameter, wherein the identification log message parameter indicates a serial number of each log message;
the identification interface parameter indicates a name of each interface;
the identification invoker system parameter indicates a name of a system invoking an interface;
the identification receiver system parameter indicates a name of a system receiving log information; and
the identification service parameter indicates a name of a service transmitted by an interface.

6. A non-transitory computer-readable storage medium, comprising a computer program, wherein the computer program is used for being executed a computer to perform the method according to claim 3.

7. The non-transitory computer-readable storage medium according to claim 6, wherein the query condition parameters further comprise one or a combination of: an interface name, an invoker, a server, a service name, a service type, a service keyword, a service response result code, service response result information, and a client code; and the computer program is used for being executed a computer to perform following method:
before displaying the second interface log information, acquiring at least one query condition parameter input by the user except the message time parameter and the system name parameter; and
selecting and determining the second interface log information for display according to the at least one query condition parameter.

8. The non-transitory computer-readable storage medium according to claim 6, wherein data parameters in the unified interface message header format comprise: an identification log message parameter, an identification interface parameter, an identification invoker system parameter, an identification receiver system parameter, and an identification service parameter, wherein the identification log message parameter indicates a serial number of each log message; the identification interface parameter indicates a name of each interface; the identification invoker system parameter indicates a name of a system invoking an interface; the identification receiver system parameter indicates a name of a system receiving log information; and the identification service parameter indicates a name of a service transmitted by an interface.

* * * * *